(12) United States Patent
Hattori et al.

(10) Patent No.: US 8,760,821 B1
(45) Date of Patent: Jun. 24, 2014

(54) HIGHER STABILITY READ HEAD USING A READ SENSOR WITH A FLAT BACK EDGE

(71) Applicant: HGST Netherlands B.V., Amsterdam (NL)

(72) Inventors: Masashi Hattori, Odawara (JP); Kouichi Nishioka, Hiratsuka (JP); Katsumi Hoshino, Odawara (JP); Hideki Mashima, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/776,553

(22) Filed: Feb. 25, 2013

(51) Int. Cl.
*G11B 5/39* (2006.01)

(52) U.S. Cl.
USPC .......................................................... 360/320

(58) Field of Classification Search
CPC .................................................... G11B 5/3929
USPC ............................. 360/313, 320, 324, 324.1
See application file for complete search history.

(56) References Cited

U.S. PATENT DOCUMENTS

| | | | |
|---|---|---|---|
| 6,223,420 B1 | 5/2001 | Lee et al. | |
| 6,493,195 B1 * | 12/2002 | Hayashi et al. | 360/322 |
| 6,728,079 B2 * | 4/2004 | Shimazawa | 360/320 |
| 7,008,550 B2 | 3/2006 | Li et al. | |
| 7,031,119 B2 * | 4/2006 | Watanabe et al. | 360/313 |
| 7,126,794 B2 * | 10/2006 | Kudo et al. | 360/313 |
| 7,154,713 B2 * | 12/2006 | Watanabe et al. | 360/313 |
| 7,231,705 B2 * | 6/2007 | Kagami et al. | 29/603.15 |
| 7,398,591 B2 * | 7/2008 | Kagami et al. | 29/603.16 |
| 7,446,981 B2 * | 11/2008 | Shintani et al. | 360/324 |
| 7,874,062 B2 | 1/2011 | Santini | |
| 7,911,744 B2 * | 3/2011 | Machita et al. | 360/320 |
| 8,011,084 B2 | 9/2011 | Le et al. | |
| 8,094,421 B2 | 1/2012 | Lin | |
| 2008/0273274 A1 | 11/2008 | Kojima et al. | |
| 2008/0274623 A1 | 11/2008 | Guthrie et al. | |
| 2011/0102949 A1 | 5/2011 | Yuan et al. | |
| 2011/0215800 A1 | 9/2011 | Zhou et al. | |

OTHER PUBLICATIONS

Cyrille et al., "Nano Processing Strategies for MR Sensor Read Width and Stripe Height Formation," 2006 IEEE, IEEE Transactions on Magnetics, vol. 42, No. 10, Oct. 2006, pp. 2434-2437.

* cited by examiner

*Primary Examiner* — Angel Castro
(74) *Attorney, Agent, or Firm* — Zilka-Kotab, PC (57) ABSTRACT

According to one embodiment, a method for forming a magnetic head having a current perpendicular to plan (CPP) sensor, includes forming a magnetoresistance effect film, performing a subtractive process for defining a back edge and a height length of the magnetoresistance effect film, depositing an insulating film adjacent the back edge of the magnetoresistance effect film, and ion milling at least an upper surface of a first portion of the insulating film located closest to the magnetoresistance effect film, where the upper surface of the first portion of the insulating film lies substantially along a plane. After the ion milling, the insulating film has no overlap of the insulating film above and/or onto the magnetoresistance effect film and no bulging in a region immediately adjacent a boundary between the insulating film and the magnetoresistance effect film.

13 Claims, 10 Drawing Sheets

HIGHER STABILITY READ HEAD USING A READ SENSOR WITH A FLAT BACK EDGE

FIELD OF THE INVENTION

The present invention relates to data storage systems, and more particularly, this invention relates to a read sensor having a flat back edge.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The miniaturization of the various components, however, presents its own set of challenges and obstacles. As higher recording densities have been adopted for magnetic recording, tunneling magnetoresistance (TMR) films and current perpendicular to plane (CPP) films have been implemented into HDD read heads. In magnetoresistance effect-type read heads such as this, a sense current flows in a direction perpendicular to a film surface, and a read output is produced in response to the magnetization orientation of the recording medium caused by changes in the film resistance and changes in the relative angle of the magnetization of the pinned layer and the magnetization of the free layer of a magnetoresistance effect film, which have their origin in the stray magnetic field from the recording medium. In order to ensure linearity of the read output at this time, a hard magnetic film is typically arranged at a left and right in a cross-track direction from the magnetoresistance effect film to act as a domain controlling layer with respect to the magnetization free layer. In addition, in order to increase the read-write resolution in a bit direction, a soft magnetic shield layer is arranged above and below the magnetoresistance effect film and the hard magnetic film.

In the above described magnetoresistance effect-type read head, a width in a film surface direction (hereinafter track-width direction) of the magnetic free layer of the magnetoresistance effect film exposed to the ABS of the head and the distance between the top and bottom soft magnetic shield layers (hereinafter gap length) must be set to appropriate widths corresponding to the surface recording density of the HDD recording medium. In addition, in order to suppress changes in the magnetic domain controlling characteristics, the height length, which expresses the length of the magnetoresistance effect film in the back-side direction of the film surface (hereinafter height direction) as seen from the ABS, must also be set to an appropriate width.

Increased recording densities in HDDs have necessitated a significant reduction in the recording bit size of the media thereof. In turn, this has necessitated a reduction in the track width and gap length of the read head. However, processes for fabricating a read head with very narrow track width may result in resolution limitations during the patterning performed by the exposure device, as well as variations in the process dimensions.

The height length of the read head is also typically reduced, similar to the reduction in track width and gap length. A significantly reduced height length, however, may affect the final finishing shape, in the height direction, of the read head and may significantly impact the read characteristics of the head. For example, if undulations are formed in the back edge (in the height direction) of the read head as a result of processing, undulations may also be produced in the soft magnetic shield layer fabricated thereon. Furthermore, these undulations may also be generated in the magnetic domain structure of the shield, resulting in deterioration in the shield performance. Moreover, for convex undulations (e.g., convexities) in particular, the distance between the magnetization free layer edge portion of the magnetoresistance effect film and the soft magnetic shield at the height back edge may be increased, which may adversely affect the function of the soft magnetic shield as a flux guide, resulting in a drop in the output during reproduction.

In conventional HDDs, the shape of the height edge portion of the read head is generally established by the employment of a conventional lift-off process. This conventional lift-off process typically employs a two layer resist as a mask material, where the underlayer resist section is undercut. However, an insulating material used for backfilling in this conventional process tends to bulge at various portions of the magnetoresistance film edge during the deposition thereof (see, e.g., FIG. 5). Consequently, the bulging of the insulating material results in a loss of planarity. Even where a polishing step is implemented to remove existing fences, the convexity of the insulating material defined by the fences typically remains after a stopper film is removed.

SUMMARY

According to one embodiment, a method for forming a magnetic head, having a current perpendicular to plan (CPP) sensor, includes forming a magnetoresistance effect film, performing a subtractive process for defining a back edge and a height length of the magnetoresistance effect film, depositing an insulating film adjacent the back edge of the magnetoresistance effect film, and ion milling at least an upper surface of a first portion of the insulating film located closest to the magnetoresistance effect film, where the upper surface of the first portion of the insulating film lies substantially along a plane. After the ion milling, the insulating film has no overlap of the insulating film above and/or onto the magnetoresistance effect film and no bulging in a region immediately adjacent a boundary between the insulating film and the magnetoresistance effect film.

According to another embodiment, a magnetic head having a current perpendicular to plan (CPP) sensor includes a magnetoresistance effect film having an air bearing surface. The magnetic head also includes an insulating film positioned on a back edge of the magnetoresistance effect film relative to the air-bearing surface, where the insulating film has an anterior surface facing towards the air-bearing surface, and where the insulating film is characterized as having an upper surface in a first portion of the insulating film located closest to the air-bearing surface, the upper surface of the first portion of the insulating film lying substantially along a plane. Further, the insulating film has no overlap of the insulating film above and/or onto the magnetoresistance effect. film and no bulging in a region immediately adjacent a boundary between the insulating film and the magnetoresistance effect film. Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

Embodiments described herein overcome the aforementioned drawbacks of conventional heads by providing a read head comprising at least a magnetoresistance effect layer and an insulating film, wherein an upper surface of the magnetoresistance layer lies in substantially the same plane as the upper surface of a first portion of the insulating film. Accordingly, in some approaches, there are no convexities—e.g., the insulating film does not overlap onto the magnetoresistance film nor does the insulating film bulge higher than an upper surface of the magnetoresistance film—in contrast to conventional read heads.

In one general embodiment, a method for forming a magnetic head having a current perpendicular to plan (CPP) sensor, includes forming a magnetoresistance effect film, performing a subtractive process for defining a back edge and a height length of the magnetoresistance effect film, depositing an insulating film adjacent the back edge of the magnetoresistance effect film, and ion milling at least an upper surface of a first portion of the insulating film located closest to the magnetoresistance effect film, where the upper surface of the first portion of the insulating film lies substantially along a plane. After the ion milling, the insulating film has no overlap of the insulating film above and/or onto the magnetoresistance effect film and no bulging in a region immediately adjacent a boundary between the insulating film and the magnetoresistance effect film.

In another general embodiment, a magnetic head having a current perpendicular to plan (CPP) sensor includes a magnetoresistance effect film having an air bearing surface. The magnetic head also includes an insulating film positioned on a back edge of the magnetoresistance effect film relative to the air-bearing surface, where the insulating film has an anterior surface facing towards the air-bearing surface, and where the insulating film is characterized as having an upper surface in a first portion of the insulating film located closest to the air-bearing surface, the upper surface of the first portion of the insulating film lying substantially along a plane. Further, the insulating film has no overlap of the insulating film above and/or onto the magnetoresistance effect film and no bulging in a region immediately adjacent a boundary between the insulating film and the magnetoresistance effect film.

Figure 1:
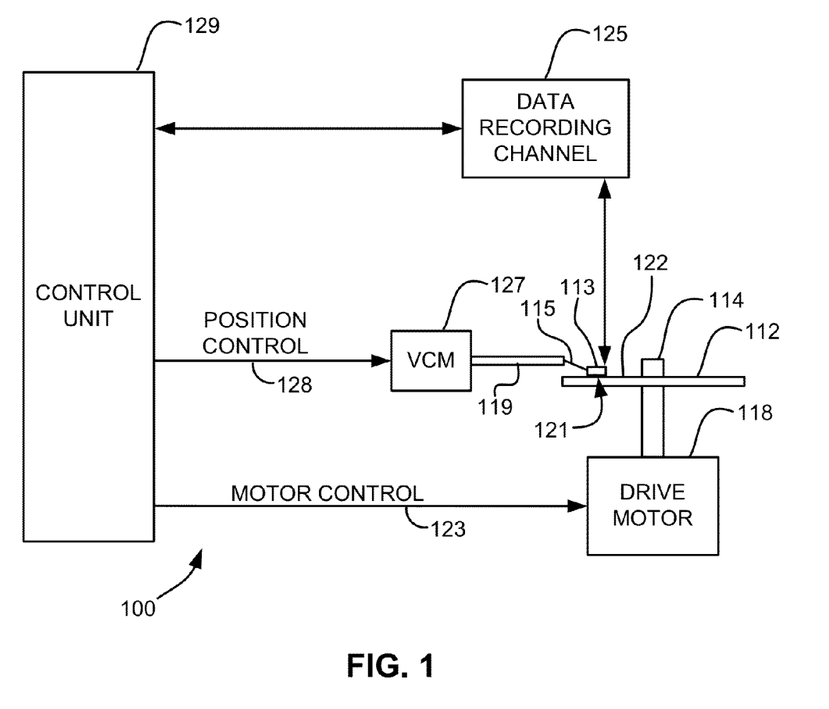
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
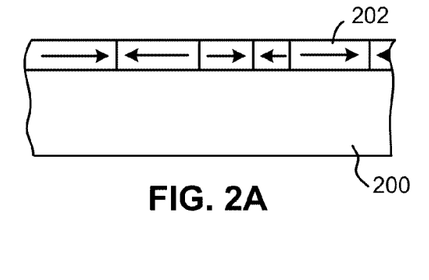
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
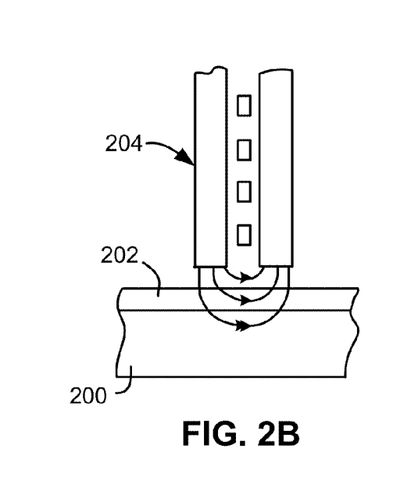
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
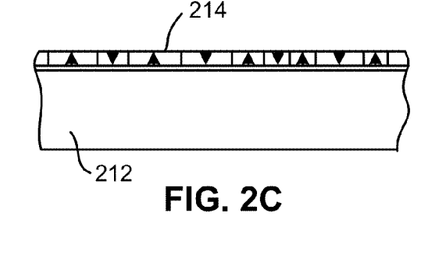
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
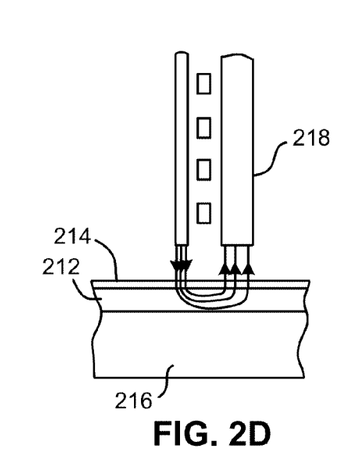
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
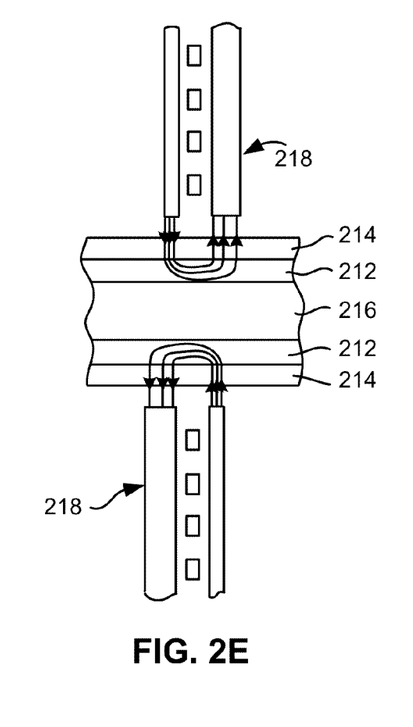
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
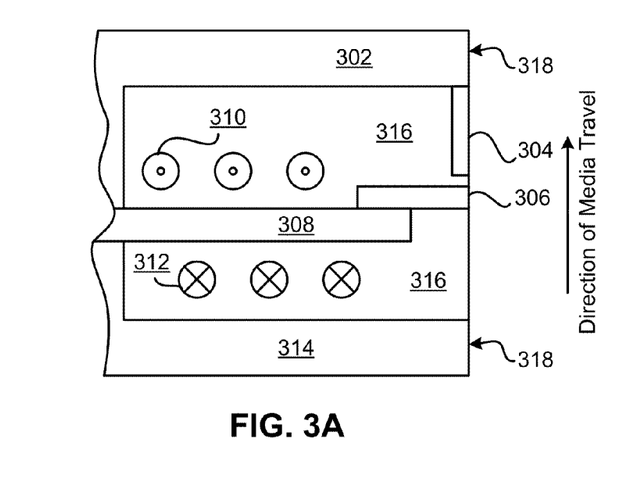
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
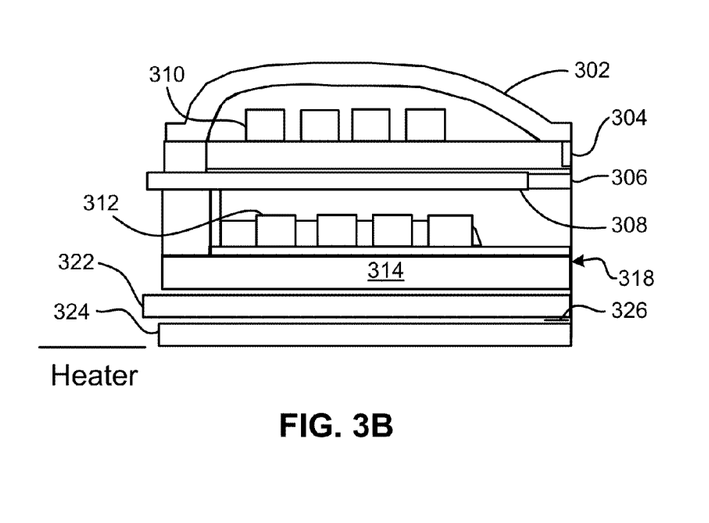
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
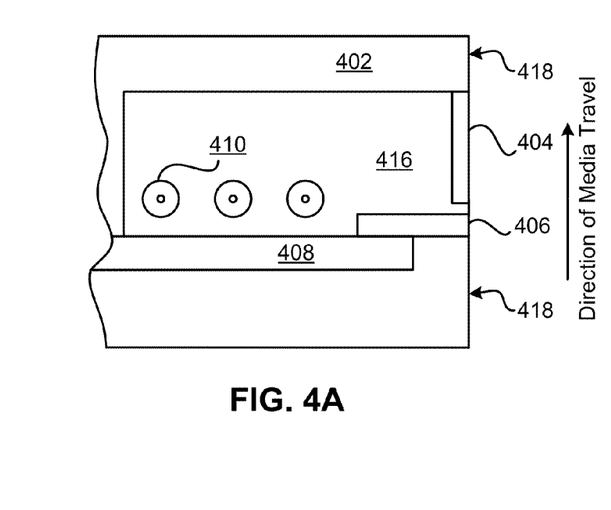
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
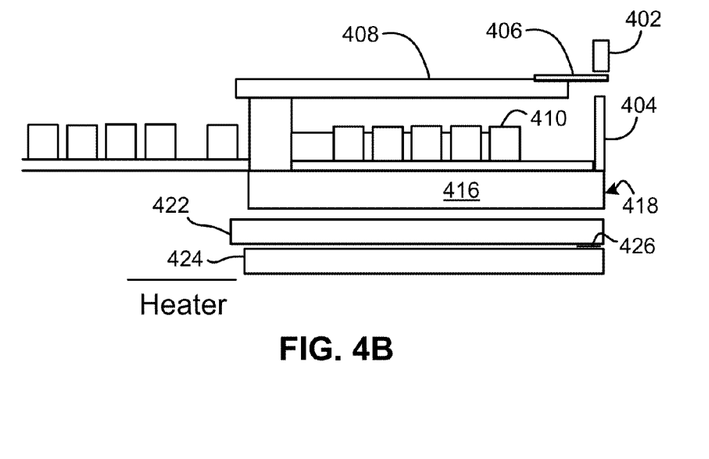
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 5:
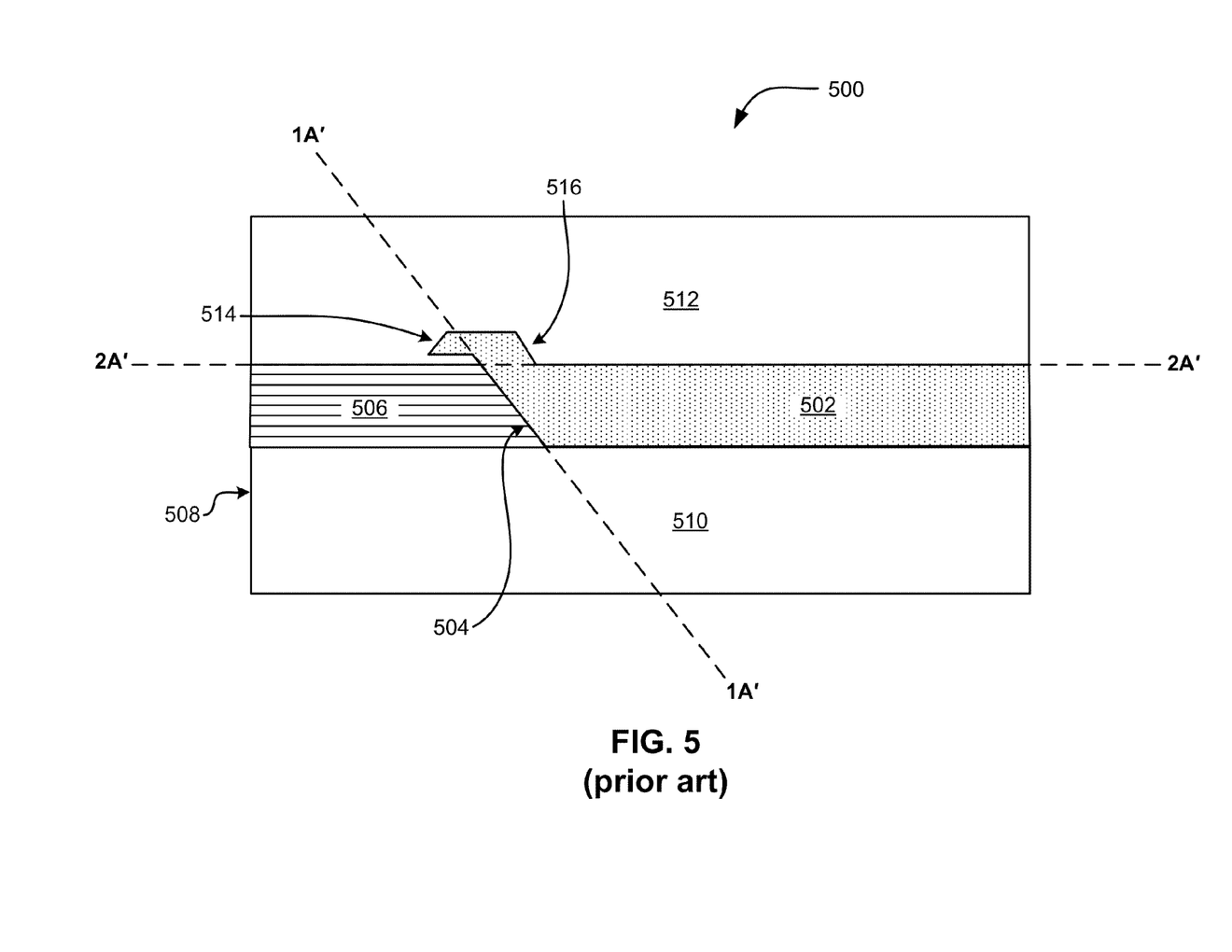
FIG. 5 is a cross-sectional view of a read head according to the prior art.

Referring now FIG. 5, a cross-sectional view of a read head 500 according to the prior art is shown. The cross-sectional view is taken parallel to a height direction of the read head. As shown in FIG. 5, an insulating layer 502 is adjacent to the back edge 504 of a magnetoresistance effect film 506 relative to the air bearing surface 508. Both the magnetoresistance effect film 506 and the insulating layer 502 are positioned above a lower magnetic shield layer 510. An upper magnetic shield layer 512 is positioned above the magnetoresistance film 506 and the insulating film 502.

As also shown in FIG. 5, there is an overlap 514 of the insulating film 502 above the magnetoresistance film 506, in a film thickness direction, where the overlap 514 is characterized by an upper portion of the insulating film 502 extending beyond a plane (denoted by line 1A') along a back edge 504 of the magnetoresistance film 506. Additionally, there is a bulging 516 of the insulating film 502, such that a portion of the insulating film 502 is higher than the plane (line 2A') extending along an upper surface of the magnetoresistance film 506. Such convexities (e.g., overlap 514 and/or bulging 516) of the insulating film 502 near a vicinity of the back edge 504 of the magnetoresistance film 506 typically results in deterioration of shield performance (e.g., a deterioration of the performance of upper shield 512).

Figure 6A:
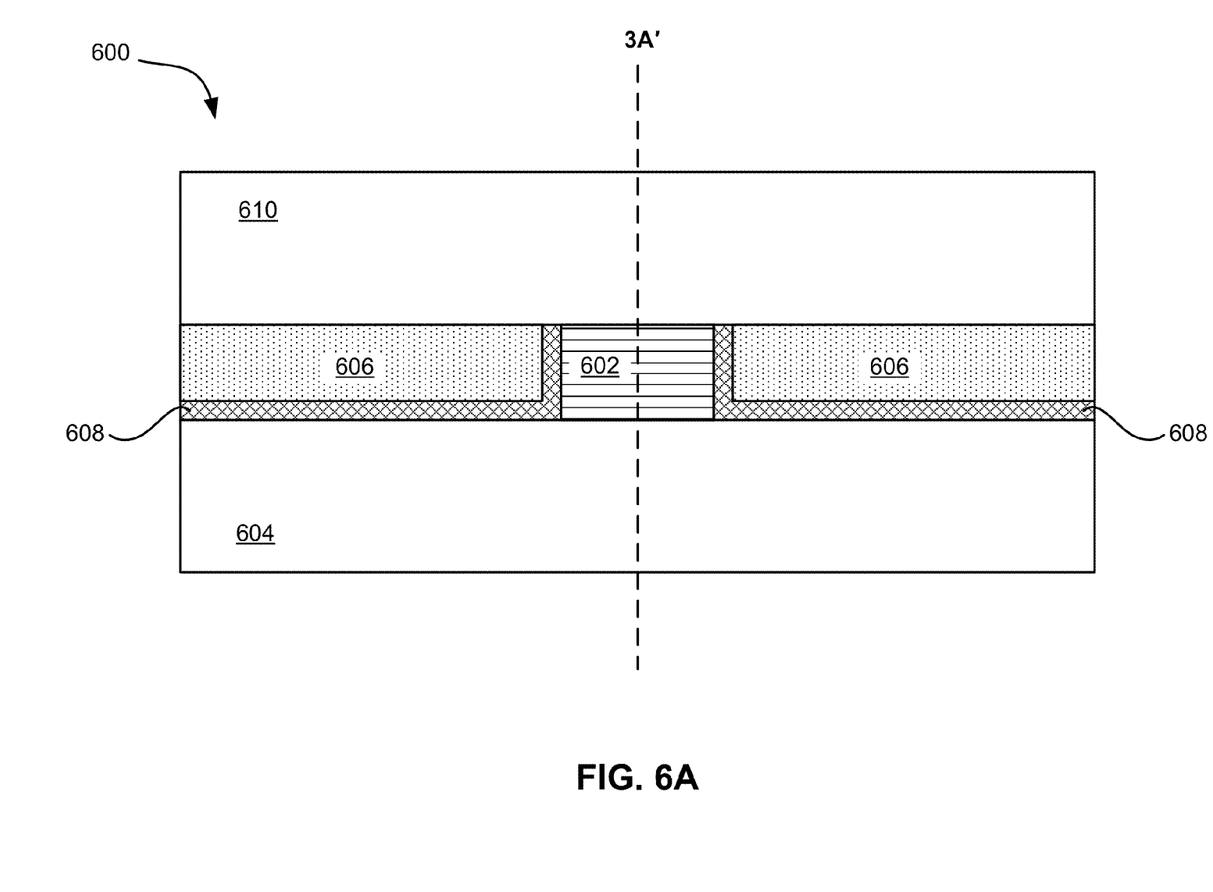
FIG. 6A is an air-bearing surface view of a read head according to one particular embodiment.
Figure 6B:
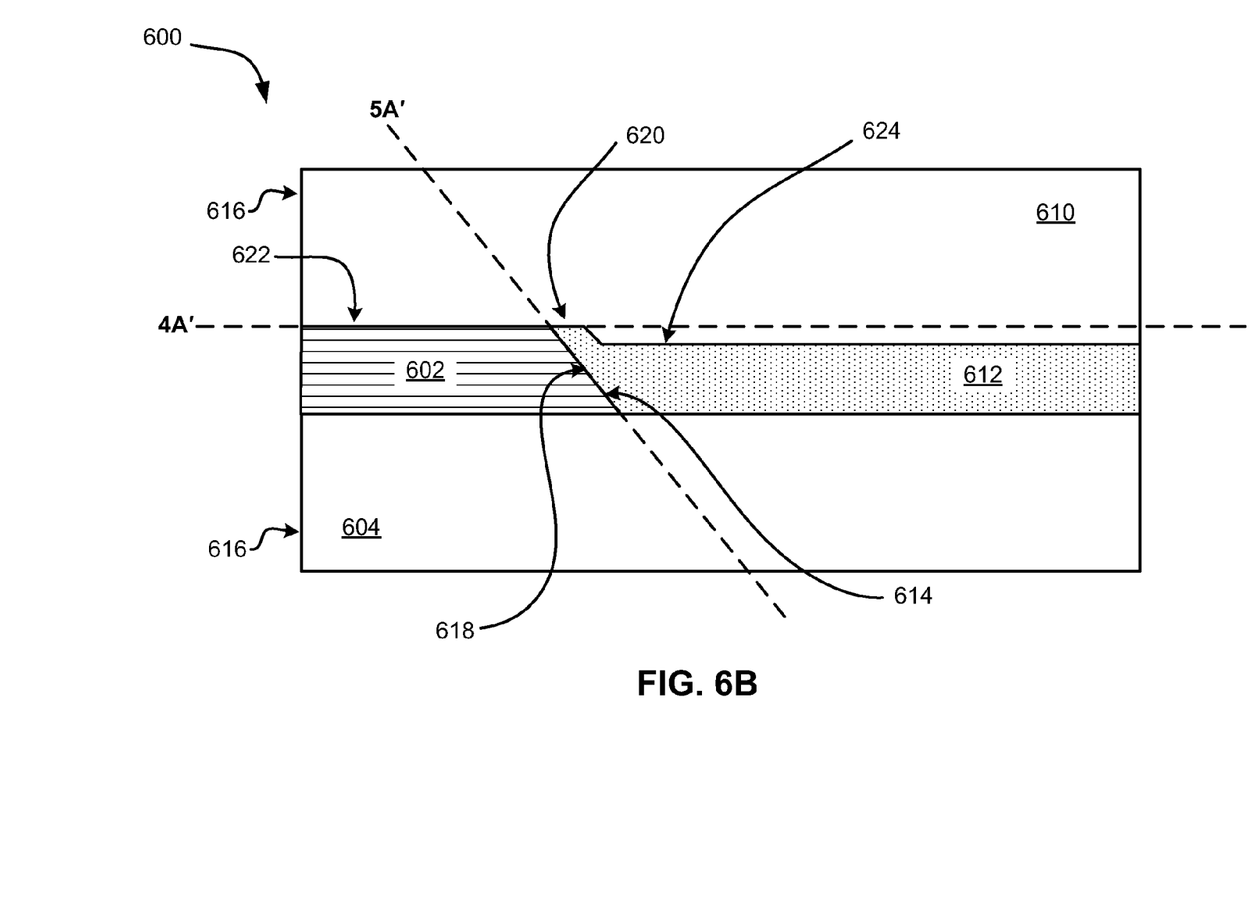
FIG. 6B is a cross sectional view of a read head taken from line 3A' of FIG. 6A.

In contrast to the conventional read head shown in FIG. 5, FIGS. 6A-6B depict a magnetic read head 600 having a CPP sensor (and none of the aforementioned convexities) according to one particular embodiment. As an option, the read head 600 may be implemented in conjunction with features from any other embodiment listed herein, such as those described with reference to the other FIGS. Of course, read head 600 and others presented herein may be used in various applications and/or in permutations, which may or may not be specifically described in the illustrative embodiments listed herein. Further, the read head 600 presented herein may be used in any desired environment.

First referring to FIG. 6A, a schematic diagram of an air-bearing surface view of a magnetic read head 600 having a CPP sensor is shown. The read head 600 includes a magnetoresistance effect film 602 positioned above a lower soft magnetic shield 604, where the lower soft magnetic shield 604 is adapted to electrically communicate with the magnetoresistance effect film 602. A hard magnetic film 606 is positioned to the left and right of the magnetoresistance effect film 602 in a track width direction. An electrically insulating film 608 is horizontally and vertically adjacent to the magnetic resistance effect film 602 and lower soft magnetic shield 602, respectively. For example, in one approach, the electrically insulating film 608 may be positioned between the magnetoresistance effect film 602 and the hard magnetic film 606, and between the hard magnetic film 606 and the lower magnetic shield 604. Additionally, an upper soft magnetic shield 610 is positioned above the magnetoresistance effect film 602 and the hard magnetic film 606, where the upper soft magnetic shield 610 is adapted to electrically communicate with the magnetoresistance effect film 602.

In some approaches, the magnetoresistance effect film 604 may include a TMR film, a current perpendicular to plan-giant magnetoresistance (CPP-GMR) film, and/or other suitable film and/or film stack known in the art.

FIG. 6B shows a cross sectional view (relative to the height direction) of the magnetic read head 600 taken from line 3A' of FIG. 6A. As shown in FIG. 6B, an insulating film 612 is positioned adjacent to (e.g. on) a back edge 614 of the magnetoresistance effect film 602 relative to the air-bearing surface 616. Note that in any of the embodiments, the air-bearing surface may be covered with a protective overlayer of known type.

In some approaches, the back edge 614 of the magnetoresistance effect film 602 may lie substantially along a plane (such as the plane denoted by line 5A'). For instance, the back edge 614 of the magnetoresistance effect film 602 may be flat.

An anterior surface 618 of the insulating film 612 faces toward the air-bearing surface 616. In addition, an upper surface in a first portion 620 of the insulating film 612 is located closest to the air-bearing surface 616. The upper surface in the first portion 620 of the insulating film 612 also lies substantially along a plane. Further, an upper surface of a second portion 624 of the insulating film 612 positioned behind the first portion 620 thereof relative to the air-bearing surface 616 is recessed from the plane (denoted by line 4A') extending along the upper surface of the first potion 620 of the insulating film 612.

As additionally shown in FIG. 6B, there is no overlap of the insulating film 612 above or onto the upper surface of the magnetoresistance film 602. In various approaches, the no overlap of the insulating film 612 may be characterized by an absence of any portion of the insulating film 612 (e.g. the absence of a convexity) beyond the plane (denoted by line 4A') along the back edge 614 of the magnetoresistance film 602.

Moreover, as shown in FIG. 6B, there is also no bulging of the insulating film 612 in a region immediately adjacent a boundary between the insulating film 612 and the magnetoresistance effect film 602. For example, in some approaches, the no bulging may be characterized by an absence of any portion of the insulating film 612 (e.g. the absence of a convexity) higher than an upper surface 622 of the magnetoresistance effect film 602. Accordingly, in one approach, the upper surface in the first portion 620 of the insulating film 612 may lie in the same plane (denoted as line 4A') as the upper surface 622 of the magnetoresistance effect film 602.

In one embodiment, a magnetic data storage system may include at least one magnetic head, such as the magnetic read head 600 described in FIGS. 6A-6B. The magnetic data storage system may also include a magnetic medium, a drive mechanism for passing the magnetic medium over the at least one magnetic head; and a controller electrically coupled to the at least one magnetic head for controlling operation of the at least one magnetic head.

Referring now to FIGS. 7A-7G, a method for producing a magnetic As an option, this method may be implemented in conjunction with features from other embodiments listed herein, such as those described with reference to the other figures. Further, this method and others presented herein may be used in various applications and/or permutations, which may or may not be specifically described in the illustrative embodiments listed herein. Moreover, more or less steps than those described below may be included in the method according to various embodiments.

Figure 7A:
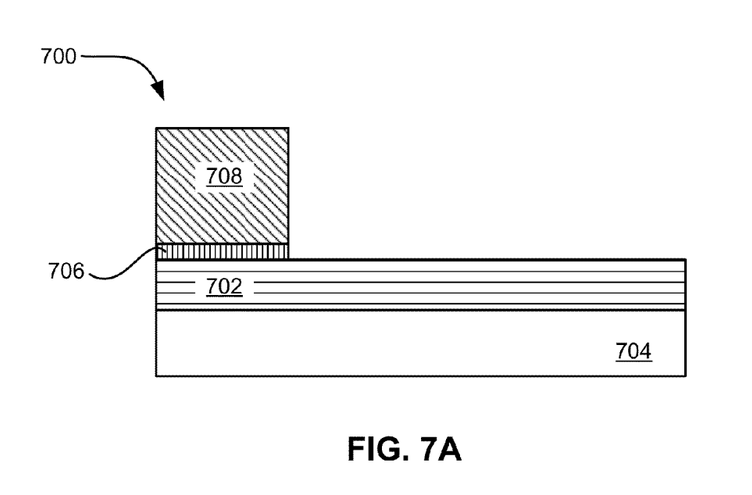
FIGS. 7A-7G shows cross sectional views of a read head during the manufacture thereof, according to various embodiments.

As shown in FIG. 7A, a magnetoresistance effect film 702 is deposited on a lower soft magnetic shield 704 on a substrate, where the lower soft magnetic shield 704 is adapted to electrically communicate with the magnetoresistance effect film 702. Further, a first chemical mechanical polishing (CMP) stopper film 706 and a photoresist 708 serving as a mask material are deposited on the magnetoresistance effect film 702. See structure 700. In some approaches, the CMP stopper film 706 may be comprised of a material for which a CMP rate is slow. For instance, the CMP stopper film 706 may be comprised of diamond like carbon (DLC) or other known material in various approaches.

Figure 7B:
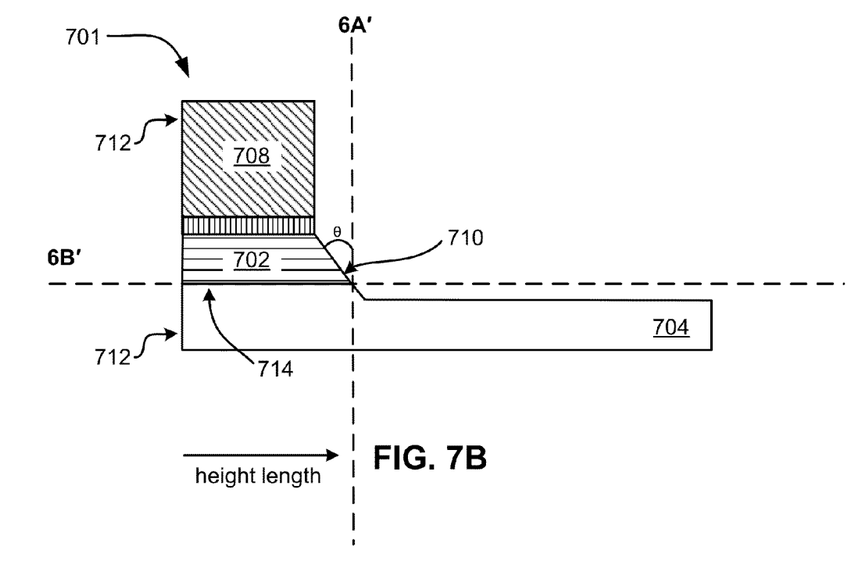

As shown in FIG. 7B, the method also includes performing a subtractive process for defining a back edge 710 and a height length of the magnetoresistance effect film 702. See structure 701. For example, patterning may be performed using photolithography, reactive ion etching (RIE), ion milling, or other suitable technique(s) known in the art. In some approaches, the back edge 710 of the magnetoresistance film 702 may not lie along a plane (denoted by line 6A') parallel to the air bearing surface 712. For example, the back edge 710 of the magnetoresistance film 702 may be formed at an angle (θ) to the plane (line 6A') parallel to the air-bearing surface 712.

In other approaches, the subtractive process may extend beyond a plane (denoted by line 6B') extending across a bottom surface 714 of the magnetoresistance film 702 and into the lower soft magnetic shield 704. See e.g. structure 701.

Figure 7C:
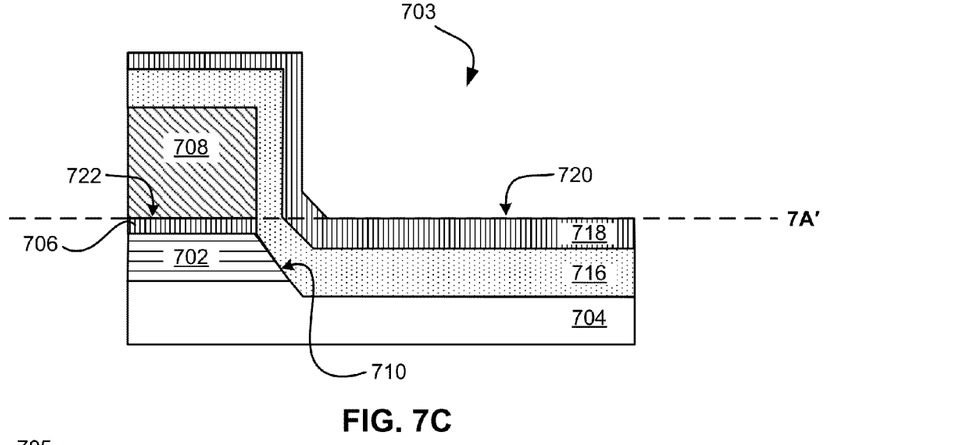

As depicted in FIG. 7C, an insulating film 716 is deposited onto structure 701 shown in FIG. 7B. For example, the insulating film 716 is deposited adjacent the back edge 710 of the magnetoresistance effect film 702. See structure 703. The insulating film 716 may comprise alumina (such as $Al_2O_3$), tantalum oxides, silicon nitrides (such as $Si_3N_4$), or other suitable insulating materials as would be understood by one having skill in the art upon reading the present disclosure. In some approaches the insulating film 716 may be selected based on its etching rate, milling rate, etc. and/or selected based on the subtractive process being implemented. Additionally, the thickness of the deposited insulating film 716 may be determined based on the film's insulation characteristics in some approaches. In other approaches, the thickness of the deposited insulating film 716 may be determined based on the desired shape of the back edge 710 of the magnetoresistance effect film 702 (e.g., based on a desired angle θ between the back edge and a plane parallel to the air-bearing surface 712).

A second CMP stopper film 718 may also be deposited on the insulating film 716. See, e.g., structure 703. In various approaches, the second CMP stopper film 718 may comprise the same material as the first CMP stopper film 706. In one embodiment, an upper surface of a portion 720 of the second CMP stopper film 718 may lie in a plane (denoted by line 7A') extending along an upper surface 722 of the first CMP stopper film 706 in order to prevent dishing caused by CMP near the back edge 710 of magnetoresistance film 702.

Figure 7D:
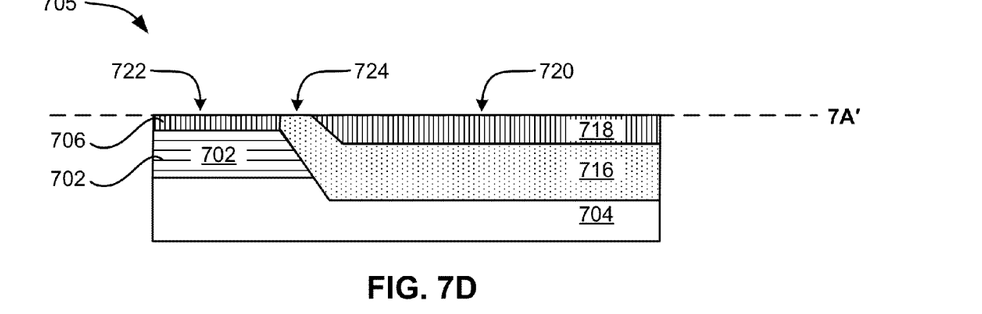

Next, a lift-off process and/or CMP may be performed on structure 703 (FIG. 7C) to achieve structure 705 in FIG. 7D. For instance, CMP may be implemented on an upper surface 722 of the first CMP stopper film 706 positioned above the magnetoresistance effect film 702, in some approaches. Additionally, CMP may be implemented on the upper surface of a first portion 724 of the insulating film 716 and an upper surface 720 of the second CMP stopper film 718, according to more approaches. In even more approaches, the upper surface 722 of the first CMP stopper film 706 may lie in the same plane (line 7A') as an upper surface 720 of the second CMP film 718 and the upper surface of a first portion 724 of the insulating film 716 after implementation of CMP processes. In additional approaches, fences may be removed via the CMP.

Figure 7E:
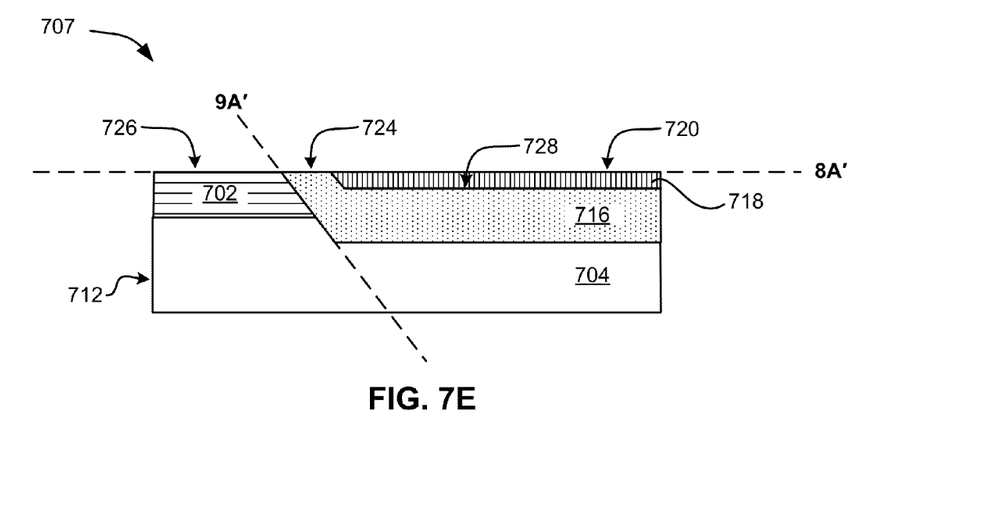

Ion milling is then performed on the first CMP stopper film 706, and/or the second CMP stopper film 718 and/or at least an upper surface of the first portion 724 of the insulating film 716 located closest to the magnetoresistance film 702, resulting in structure 707 of FIG. 7E. In some approaches, a substantial portion of the first CMP stopper film 706 is removed via the ion milling. In more approaches, the ion milling may planarize the upper surface of the first portion 724 of the insulating film 716, such that the upper surface of the first portion 724 lies substantially along a plane. In some approaches, an upper surface 726 of the magnetoresistance effect film 702 may lie in the same plane (denoted by line 8A') as the upper surface of the first portion 724 of the insulating film 716. In other approaches, the upper surface 726 of the magnetoresistance effect film 702 may lie in the same plane (line 8A') as the upper surface of the first portion 724 of the insulating film 716 and the upper surface 720 of the second CMP stopper film 718.

Various ion milling times and/or ion milling angles may be implemented in some embodiments. For instance, in one embodiment, the ion milling angle may be between 0° and 20° in a direction perpendicular to the film surface.

Further, after the ion milling, there is no overlap of the insulating film 716 above and/or onto the magnetoresistance effect film 702. In various approaches, the no overlap of the insulating film may be characterized by an absence of any portion of the insulating film 716 beyond the plane (denoted by line 9A') along the back edge 710 of the magnetoresistance film 702. Moreover, after the ion milling, there is also no bulging in a region immediately adjacent a boundary between the insulating film 716 and the magnetoresistance effect film 702 (e.g. near the back edge 710 of the magnetoresistance effect film). For example, in some approaches, the no bulging may be characterized by an absence of any portion of the insulating film 716 (e.g. the absence of a convexity) higher than the upper surface 726 of the magnetoresistance effect film 702. Accordingly, in one approach, the upper surface 726 of the magnetoresistance effect film 702 may lie in the same plane (line 8A') as the upper surface in the first portion 724 of the insulating film 716.

According to one embodiment, the upper surface of the first portion 724 of the insulating film 716 may have a physical characteristic of having been ion milled. For example, as discussed directly above, the insulating film 716 may have no overlap of the insulating film 716 above and/or onto the magnetoresistance effect film 702 and no bulging in the region immediately adjacent the boundary between the insulating film 716 and the magnetoresistance effect film 702 (e.g. the region near the back edge 710 of the magnetoresistance effect film 702).

In another embodiment, the insulating film 716 may be characterized as having a first portion 724 located closest to the air bearing surface 712, as well as a second portion 728 positioned behind the first portion 724 thereof relative to the air-bearing surface 712.

As discussed above, a portion of the lower soft magnetic shield 704 may have been etched during the subtractive process; thus, a second portion 728 of the insulating film 716 deposited on the lower soft magnetic shield 704 may be recessed from a plane (line 8A') extending along the upper surface of the first portion 724 of the insulating film 716, according to one embodiment. In another embodiment, an upper surface of the second portion 728 of the insulating film 716 may not have the physical characteristic of having been ion milled. This upper surface of the second portion 728 of the insulating film 716 may not have the physical characteristic because the upper surface of the second portion 728 may have been under the second CMP stopper film 718 during the ion milling process.

Figure 7F:
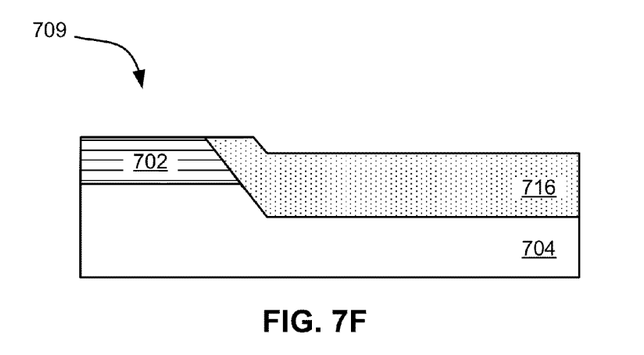
Figure 7G:
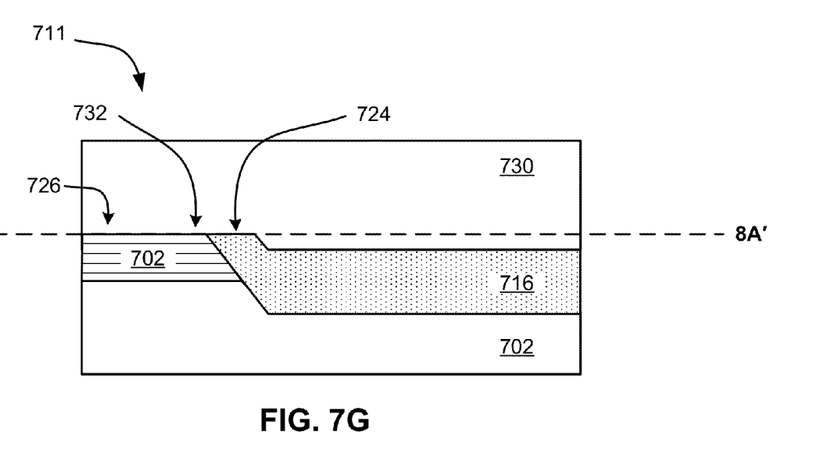

Next, the remaining portions of the first and second CMP stopper films (706 and 718, respectively) are removed to achieve structure 709 of FIG. 7F. Removal of the first and second CMP stopper films 706, 718 may be achieved using RIE or other suitable process known in the art. Finally, as shown in FIG. 7G, an upper soft magnetic shield 730 is formed above the magnetoresistance effect film 702 and the insulating film 716, where the upper soft magnetic shield 730 is adapted to electrically communicate with the magnetoresistance effect film 702.

In some approaches, a portion of the lower surface 732 of the upper soft magnetic shield 730 may be formed substantially along a plane (e.g. planarly formed) when the upper surface 726 of the magnetoresistance effect film 702 lies in the same plane as the upper surface of the first portion 724 of the insulating film 716. Accordingly, the generation of magnetic domain structure may be avoided.

Now referring to FIGS. 8A-8D, cross sectional views of a read head after several ion milling times are shown, according to various embodiments. In FIGS. 8A-8D, a magnetoresistance effect film comprises a TMR film, and an insulating film comprises Al$_2$O$_3$. Furthermore, in FIGS. 8A-8D, an ion milling angle of 5° in a direction perpendicular to film surface was used.

Figure 8A:
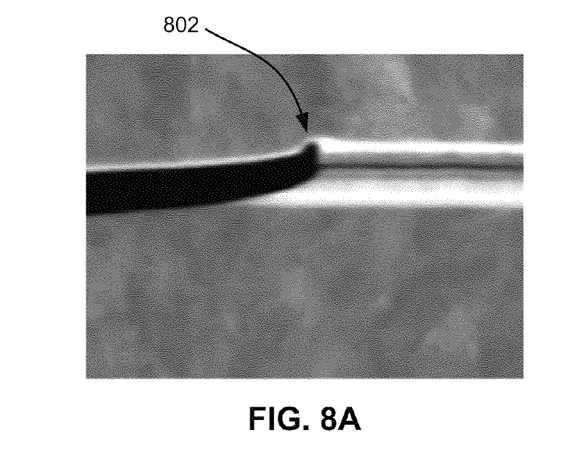
FIGS. 8A-8D shows cross sectional views of read heads after several ion milling times, according to various embodiments.
Figure 8B:
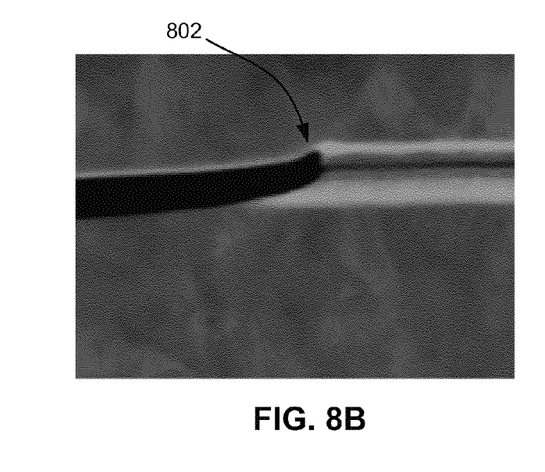
Figure 8C:
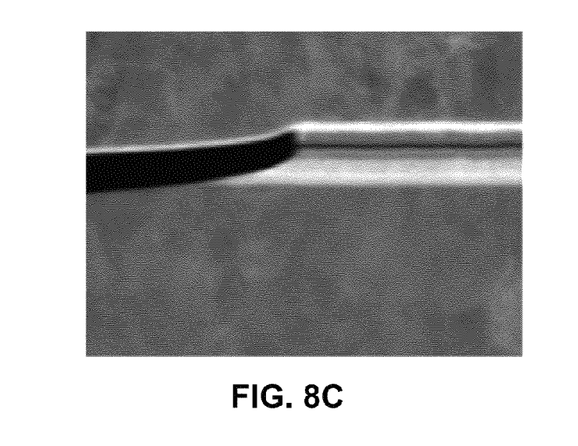
Figure 8D:
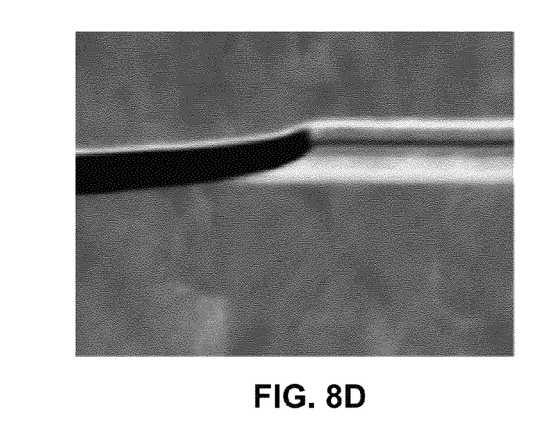

As shown in FIG. 8A for an ion milling time of zero seconds, the presence of convexities 802 (e.g. overlap and/or bulging of the insulating film above and/or onto the magnetoresistance effect film) are apparent. As the ion milling time is increased, for e.g. to 60 seconds (FIG. 8B), 120 seconds (FIG. 8C) and 180 seconds (FIG. 8D), these convexities are reduced and/or eliminated. In some approaches, the ion milling time may be set to 120 second or more, as substantially all of the convexities are removed (e.g. there is no overlap or bulging of the insulating film above and/or onto the magnetoresistance effect film), as seem in FIGS. 8C and 8D.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head having a current perpendicular to plan (CPP) sensor, comprising:
   a magnetoresistance effect film having an air bearing surface;
   an insulating film positioned on a back edge of the magnetoresistance effect film relative to the air-bearing surface, the insulating film having an anterior surface facing towards the air-bearing surface,
   the insulating film being characterized as having an upper surface in a first portion of the insulating film located closest to the air-bearing surface,
   the upper surface of the first portion of the insulating film lying substantially along a plane,
   the insulating film having no overlap of the insulating film above and/or onto the magnetoresistance effect film and no bulging in a region immediately adjacent a boundary between the insulating film and the magnetoresistance effect film,
   wherein an upper surface of the magnetoresistance effect film lies in a same plane as the upper surface of the first portion of the insulating film,
   wherein an upper surface of the insulating film in a second portion of the insulating film positioned behind the first portion thereof relative to the air-bearing surface is recessed from the plane extending along the upper surface of the first portion of the insulating film.

2. The magnetic head as recited in claim 1, wherein the upper surface of the first portion of the insulating film has a physical characteristic of having been ion milled.

3. The magnetic head as recited in claim 2, wherein an upper surface of the insulating film in a second portion of the insulating film positioned behind the first portion thereof relative to the air-bearing surface is recessed from the plane extending along the upper surface of the first portion, wherein the upper surface of the second portion of the insulating film does not have the physical characteristic of having been ion milled.

4. The magnetic head as recited in claim 1, further comprising an upper soft magnetic shield above the magnetoresistance effect film and insulating film, the upper soft magnetic shield being adapted to electrically communicate with the magnetoresistance effect film.

5. The magnetic head as recited in claim 1, wherein the no bulging is exhibited by an absence of a convexity higher than an upper surface of the magnetoresistance effect film in an immediate vicinity of the boundary between the insulating film and the magnetoresistance effect film.

6. A magnetic data storage system, comprising:
   at least one magnetic head as recited in claim 1;
   a magnetic medium;
   a drive mechanism for passing the magnetic medium over the at least one magnetic head; and
   a controller electrically coupled to the at least one magnetic head for controlling operation of the at least one magnetic head.

7. The magnetic head as recited in claim 1, wherein a bottom surface of the insulating film is recessed from a plane extending along a bottom surface of the magnetoresistance effect film.

8. The magnetic head as recited in claim 1, wherein the magnetoresistance effect film is a current perpendicular to plan giant magnetoresistance (CPP-GMR) film.

9. The magnetic head as recited in claim 1, wherein the back edge of the magnetoresistance effect film is at an angle ($\theta$) to a plane parallel to the air-bearing surface.

10. The magnetic head as recited in claim 9, wherein $\theta$ does not equal 0° or 180°.

11. The magnetic head as recited in claim 1, wherein the insulating layer comprises at least one of a tantalum oxide and a silicon nitride.

12. The magnetic head as recited in claim 1, wherein an upper surface of the magnetoresistance effect film lies in a same plane as the upper surface of the first portion of the insulating film; and wherein the no bulging is exhibited by an absence of a convexity higher than an upper surface of the magnetoresistance effect film in an immediate vicinity of the boundary between the insulating film and the magnetoresistance effect film.

13. The magnetic head as recited in claim 1, further comprising:
  an upper soft magnetic shield located above at least the upper surface of the magnetoresistance film; and
  a lower soft magnetic shield located below at least a lower surface of the magnetoresistance film.

* * * * *